US011678336B2

(12) United States Patent
Fakoorian et al.

(10) Patent No.: US 11,678,336 B2
(45) Date of Patent: Jun. 13, 2023

(54) INDICATION DESIGN AND SIGNALING

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Wanshi Chen, San Diego, CA (US); Wei Yang, San Diego, CA (US); Chih-Ping Li, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/832,965

(22) Filed: Mar. 27, 2020

(65) Prior Publication Data

US 2020/0314882 A1    Oct. 1, 2020

Related U.S. Application Data

(60) Provisional application No. 62/826,628, filed on Mar. 29, 2019.

(51) Int. Cl.
*H04W 72/23* (2023.01)
*H04L 5/00* (2006.01)
*H04W 72/1273* (2023.01)
*H04W 76/19* (2018.01)
*H04W 24/08* (2009.01)
*H04W 72/53* (2023.01)

(52) U.S. Cl.
CPC ........... *H04W 72/23* (2023.01); *H04L 5/0053* (2013.01); *H04L 5/0051* (2013.01); *H04W 24/08* (2013.01); *H04W 72/1273* (2013.01); *H04W 72/53* (2023.01); *H04W 76/19* (2018.02)

(58) Field of Classification Search
CPC ........... H04W 72/1273; H04W 72/042; H04W 76/19; H04W 72/0493; H04W 24/08; H04L 5/0051; H04L 5/0053
See application file for complete search history.

(56) References Cited

U.S. PATENT DOCUMENTS

2013/0114514 A1* 5/2013 Nissila ................. H04L 5/0035
370/329
2017/0237539 A1* 8/2017 Xu ..................... H04W 72/0446
370/329

(Continued)

OTHER PUBLICATIONS

ETSI TS 136 213 v12.3.0 (3GPP TS 36.213 v12.3.0 Release 12), Oct. 2014. (Year: 2014).*

(Continued)

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a user equipment may receive an indication associated with processing a communication, wherein the indication includes at least one of a physical downlink control channel (PDCCH)-based indication and a sequence-based indication, and wherein the UE is configured to receive PDCCH-based indications and sequence-based indications; and processing the communication based at least in part on the indication. Numerous other aspects are provided.

30 Claims, 10 Drawing Sheets

(56) References Cited

U.S. PATENT DOCUMENTS

| | | | | |
|---|---|---|---|---|
| 2018/0027576 | A1* | 1/2018 | Kowalski | H04W 72/0446 |
| | | | | 370/329 |
| 2018/0035332 | A1* | 2/2018 | Agiwal | H04W 74/085 |
| 2018/0191483 | A1* | 7/2018 | Yamazaki | H04L 5/14 |
| 2019/0215211 | A1* | 7/2019 | Xue | H04L 5/0048 |
| 2019/0327757 | A1* | 10/2019 | Oteri | H04W 72/0406 |
| 2020/0008216 | A1* | 1/2020 | Iyer | H04W 72/042 |
| 2020/0119895 | A1* | 4/2020 | Choi | H04W 76/27 |
| 2020/0259601 | A1* | 8/2020 | Zhou | H04L 5/0085 |
| 2020/0344780 | A1* | 10/2020 | Choi | H04L 5/0058 |
| 2021/0022079 | A1* | 1/2021 | Shen | H04W 76/28 |
| 2021/0235474 | A1* | 7/2021 | Frenne | H04W 76/27 |

OTHER PUBLICATIONS

CATT: "Remaining Details on Inter-UE UL Multiplexing", 3GPP Draft, 3GPP TSG RAN WG1 Meeting #96, R1-1902006, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599701, 8 pages, Retrieved from the Internet: URL: http://www.3gpp.org/ftp/tsg%5Fran/WG1%5FRL1/TSGR1%5F96/Docs/R1%2D1902006%2Ezip. [retrieved on Feb. 16, 2019] p. 3.
International Search Report and Written Opinion—PCT/US2020/025785—ISA/EPO—dated Jul. 17, 2020.
Mitsubishi Electric: "Views on Pre-Emption for UL Inter UE Tx Multiplexing", 3GPP Draft, 3GPP TSG RAN WG1 Meeting #96, R1-1902838, URLLC Interue Mitbs, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600533, 6 pages, Retrieved from the Internet: URL: http://www.3gpp.org/ftp/tsg%5Fran/WG1%5FRL1/TSGR1%5F96/Docs/R1%2D1902838%2Ezip.
OPPO: "Consideration on UL Inter UE Tx Prioritization and Multiplexing", 3GPP Draft, 3GPP TSG RAN WG1 Ad-Hoc Meeting 1901, R1-1900286, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593200, 8 pages, Retrieved from the Internet: URL: http://www.3gpp.org/ftp/Meelings%5F3GPP%5FSYNC/RAN1/Docs/R1%2D1900286%2Ezip. [retrieved on Jan. 20, 2019] section 2.1.
3GPP TS 36.213: "3rd Generation Partnership Project, Technical Specification Group Radio Access Network, Evolved Universal Terrestrial Radio Access (E-UTRA), Physical layer procedures (Release 12)", 3GPP Standard, 3rd Generation Partnership Project (3GPP), Mobile Competence Centre, 650, Route Des Lucioles, F-06921 Sophia-Anti Polis Cedex, France, vol. RAN WG11, No. V12.3.0, Sep. 26, 2014 (Sep. 26, 2014), pp. 1-212, XP050926112, [Retrieved on Sep. 26, 2014] Section 7.3 Section 8.3 Sections 10.1.2 and 10.1.3.

* cited by examiner

INDICATION DESIGN AND SIGNALING

CROSS-REFERENCE TO RELATED APPLICATION

This Patent Application claims priority to Provisional Patent Application No. 62/826,628, filed on Mar. 29, 2019, entitled "UPLINK PREEMPTION INDICATION DESIGN AND SIGNALING," and assigned to the assignee hereof. The disclosure of the prior Application is considered part of and is incorporated by reference in this Patent Application.

FIELD OF THE DISCLOSURE

Aspects of the present disclosure generally relate to wireless communication, and more particularly to techniques and apparatuses for indication design and signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving an indication associated with a communication, wherein the indication includes at least one of a physical downlink control channel (PDCCH) -based indication and a sequence-based indication, and wherein the UE is configured to receive PDCCH-based indications and sequence-based indications; and processing the communication based at least in part on the indication.

In some aspects, a method of wireless communication, performed by a base station, may include determining an indication to be signaled to a UE in association with processing a communication, wherein the indication includes at least one of a PDCCH-based indication and a sequence-based indication; and signaling the indication to the UE in association with processing the communication.

In some aspects, a UE for wireless communication may include a memory and one or more processors operatively coupled to the memory. The memory and the one or more processors may be configured to receive an indication associated with a communication, wherein the indication includes at least one of a PDCCH-based indication and a sequence-based indication, and wherein the UE is configured to receive PDCCH-based indications and sequence-based indications; and process the communication based at least in part on the indication.

In some aspects, a base station for wireless communication may include a memory and one or more processors operatively coupled to the memory. The memory and the one or more processors may be configured to determine an indication to be signaled to a UE in association with processing a communication, wherein the indication includes at least one of a PDCCH-based indication and a sequence-based indication; and signal the indication to the UE in association with processing the communication.

In some aspects, a non-transitory computer-readable medium may store one or more instructions for wireless communication. The one or more instructions, when executed by one or more processors of a UE, may cause the one or more processors to receive an indication associated with a communication, wherein the indication includes at least one of a PDCCH-based indication and a sequence-based indication, and wherein the UE is configured to receive PDCCH-based indications and sequence-based indications; and process the communication based at least in part on the indication.

In some aspects, a non-transitory computer-readable medium may store one or more instructions for wireless communication. The one or more instructions, when executed by one or more processors of a base station, may cause the one or more processors to determine an indication to be signaled to a UE in association with processing a communication, wherein the indication includes at least one of a PDCCH-based indication and a sequence-based indication; and signal the indication to the UE in association with processing the communication.

In some aspects, an apparatus for wireless communication may include means for receiving an indication associated with a communication, wherein the indication includes at least one of a PDCCH-based indication and a sequence-based indication, and wherein the UE is configured to receive PDCCH-based indications and sequence-based indications; and means for processing the communication based at least in part on the indication.

In some aspects, an apparatus for wireless communication may include means for determining an indication to be signaled to a UE in association with processing a communication, wherein the indication includes at least one of a PDCCH-based indication and a sequence-based indication; and means for signaling the indication to the UE in association with processing the communication.

Aspects generally include a method, apparatus, system, computer program product, non-transitory computer-readable medium, user equipment, base station, wireless communication device, and processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
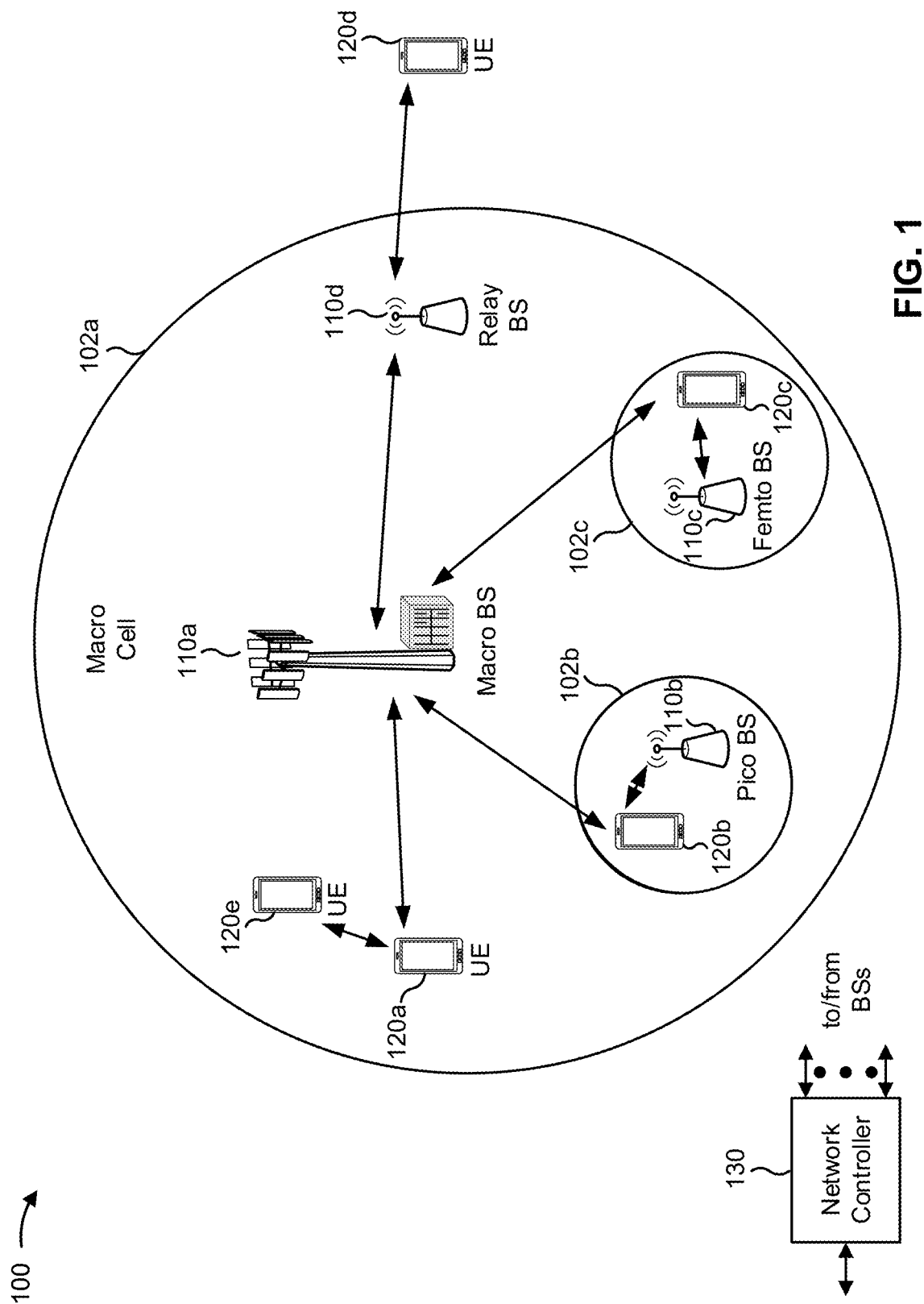
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
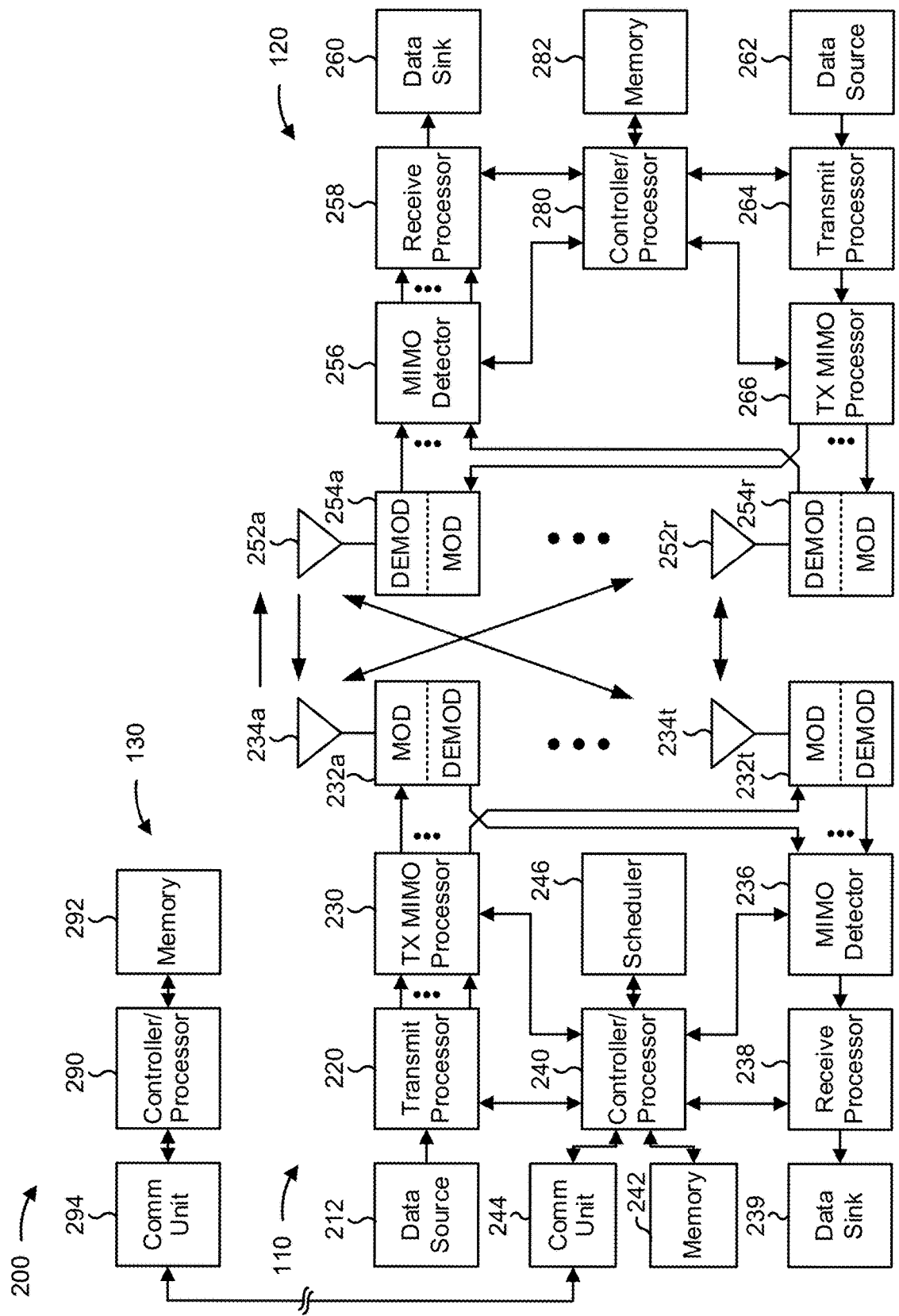
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indication design and signaling, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a UE 120 may include means for receiving an indication associated with processing a communication (e.g., stopping a transmission of an uplink communication), wherein the indication includes at least one of a PDCCH-based indication and a sequence-based indication, and wherein the apparatus is configured to receive PDCCH-based indications and sequence-based indications; means for processing the communication (e.g., stopping the transmission of the uplink communication) based at least in part on the indication; and/or the like. In some aspects, such means may include one or more components of UE 120 described in connection with FIG. 2.

In some aspects, base station 110 may include means for determining an indication to be signaled to UE 120 in association with processing a communication (e.g., stopping a transmission of an uplink communication), wherein the indication includes at least one of a PDCCH-based indication and a sequence-based indication; means for signaling the indication to the UE in association with processing the communication (e.g., stopping the transmission of the uplink communication); and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
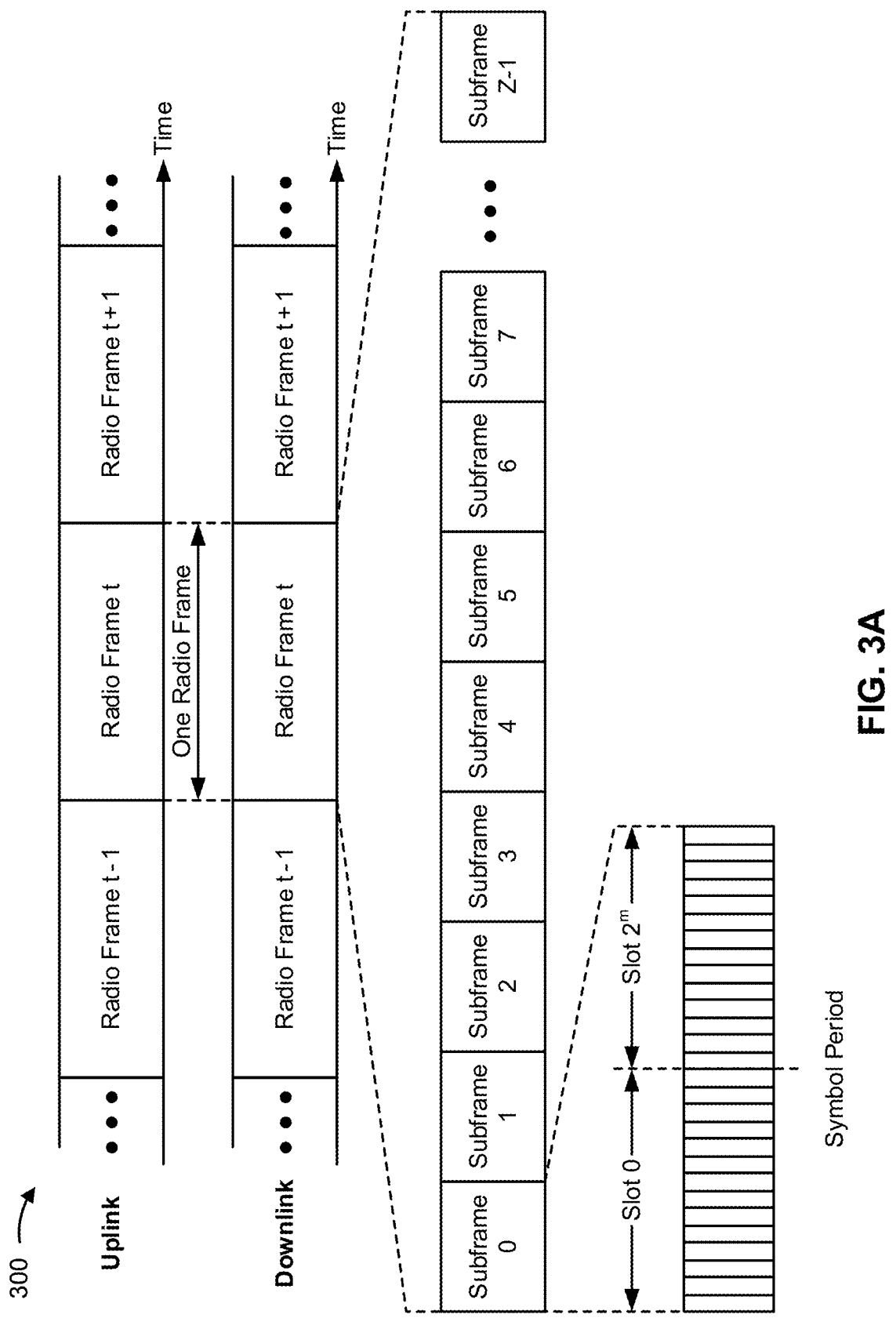
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
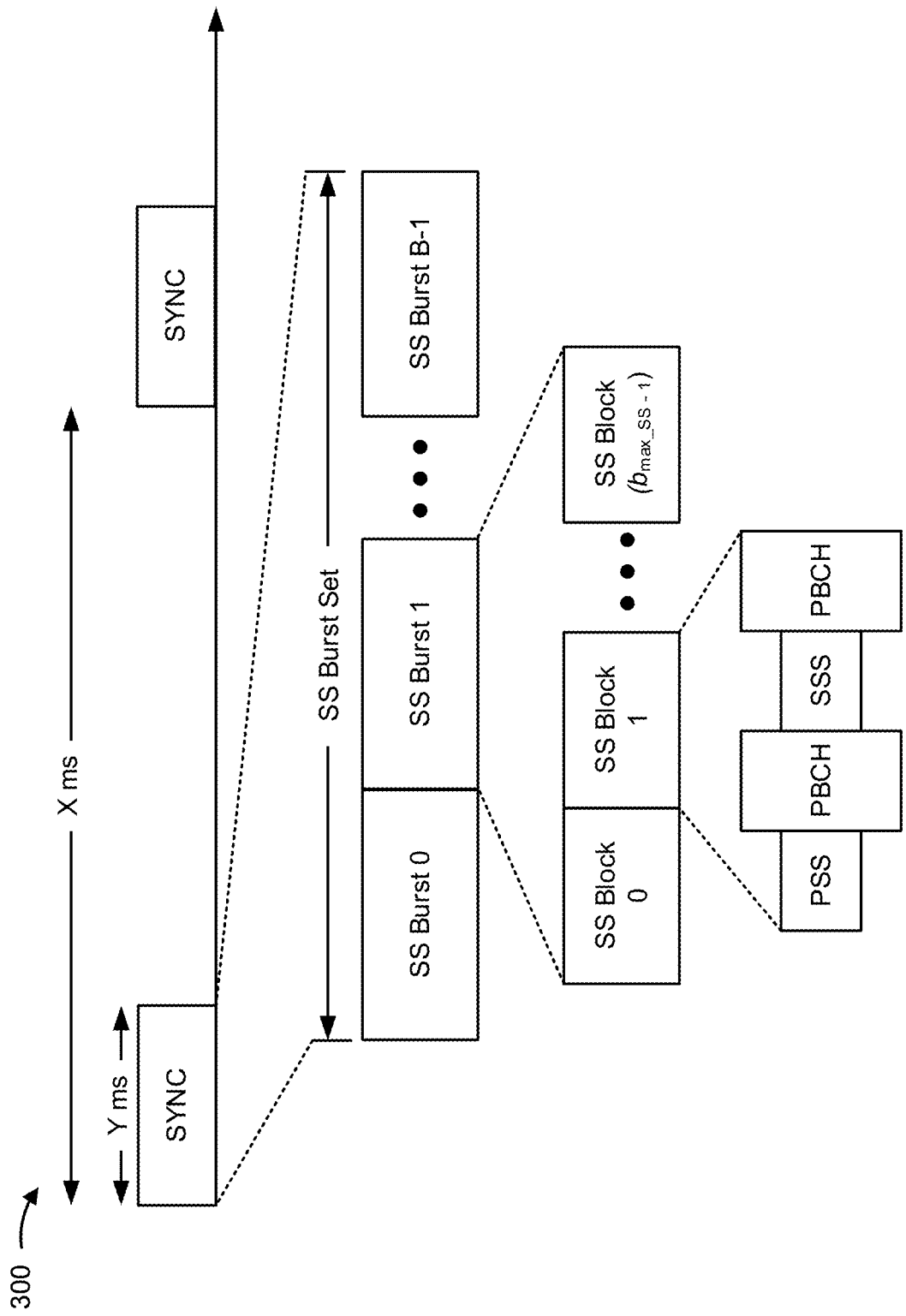
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($_{bmax\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
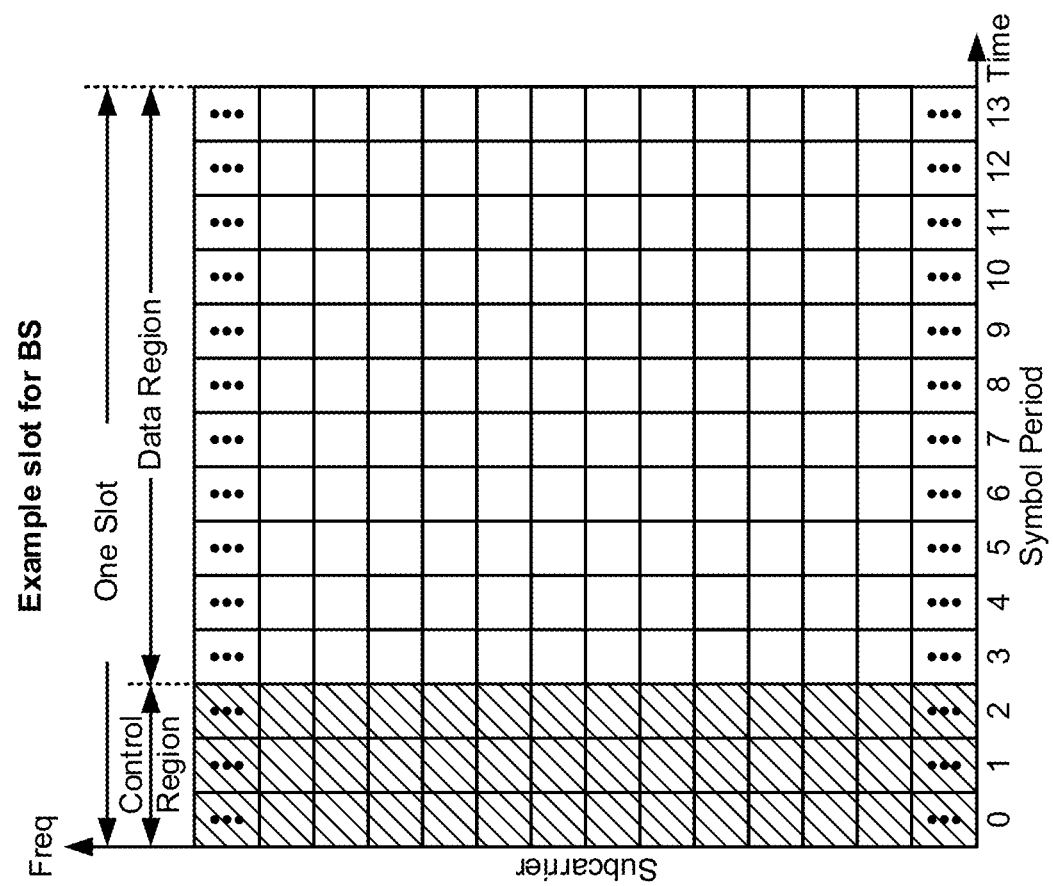
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q $\in\{0, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
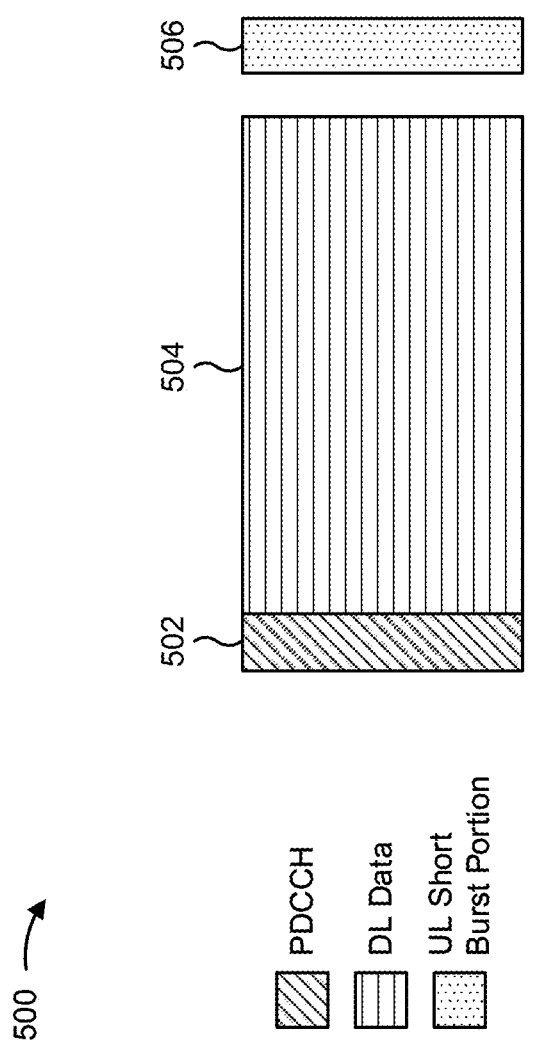
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
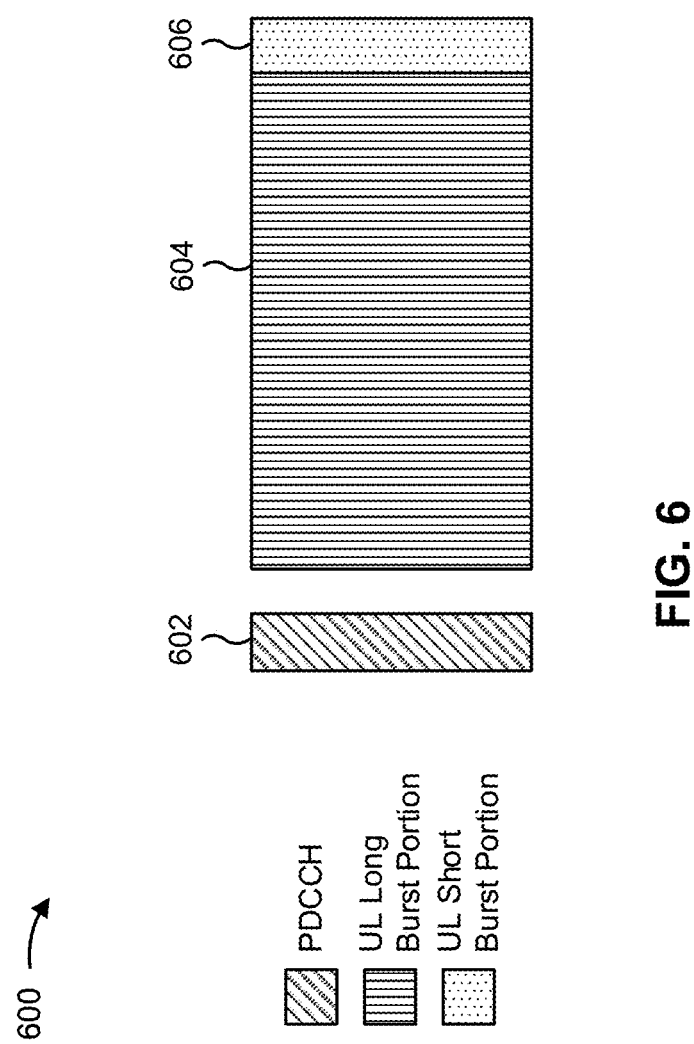
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, "sidelink signal" may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

An uplink preemption indication is an indication designed to be used in association with causing a UE to stop a transmission of an uplink communication. Applicable scenarios for use of uplink preemption indications include, for example, enabling an uplink inter-UE transmission prioritization/multiplexing scheme (e.g., associated with enhancing transmission of PUSCH communications associated with a URLLC service).

Put generally, an uplink preemption indication scheme may be designed to cause a UE to stop an uplink transmission upon detecting the uplink preemption indication (e.g., by canceling a transmission of an uplink communication that has not been started, by ceasing an on-going transmission of an uplink communication, and/or the like). In some cases, the uplink preemption indication scheme may be designed to cause the UE to resume the transmission at some point in time after stopping the transmission, or may be designed such that the UE does not resume the transmission after stopping the transmission. Possible options for a base station to signal an uplink preemption indication to a UE are a PDCCH-based uplink preemption indication (e.g., signaled in group common DCI or UE-specific DCI) or a sequence-based uplink preemption indication (e.g., signaled using a group common sequence or a UE-specific sequence).

Notably, using a sequence-based indication may reduce PDCCH overhead (e.g., since the uplink preemption indication does not require use of PDCCH resources) and, therefore, may conserve radio resources and/or have no impact on PDCCH transmissions. However, the sequence-based indication may have a coarse granularity (e.g., as compared to a PDCCH-based indication), meaning that the sequence-based indication may be capable of carrying only an indication to stop a transmission of an uplink. In other words, the sequence-based indication may not be capable of carrying information that identifies a time at which the UE is to stop the uplink transmission or a time at which the UE is to resume the uplink transmission (e.g., as would be possible in the case of a PDCCH-based indication). This issue is particularly problematic when the sequence-based indication is signaled to a group of UEs, since network inefficiencies may be introduced (e.g., radio resources that could have otherwise been used for uplink transmissions may go unused).

Some aspects described herein provide indication design and signaling associated with defining an indication scheme.

Figure 7:
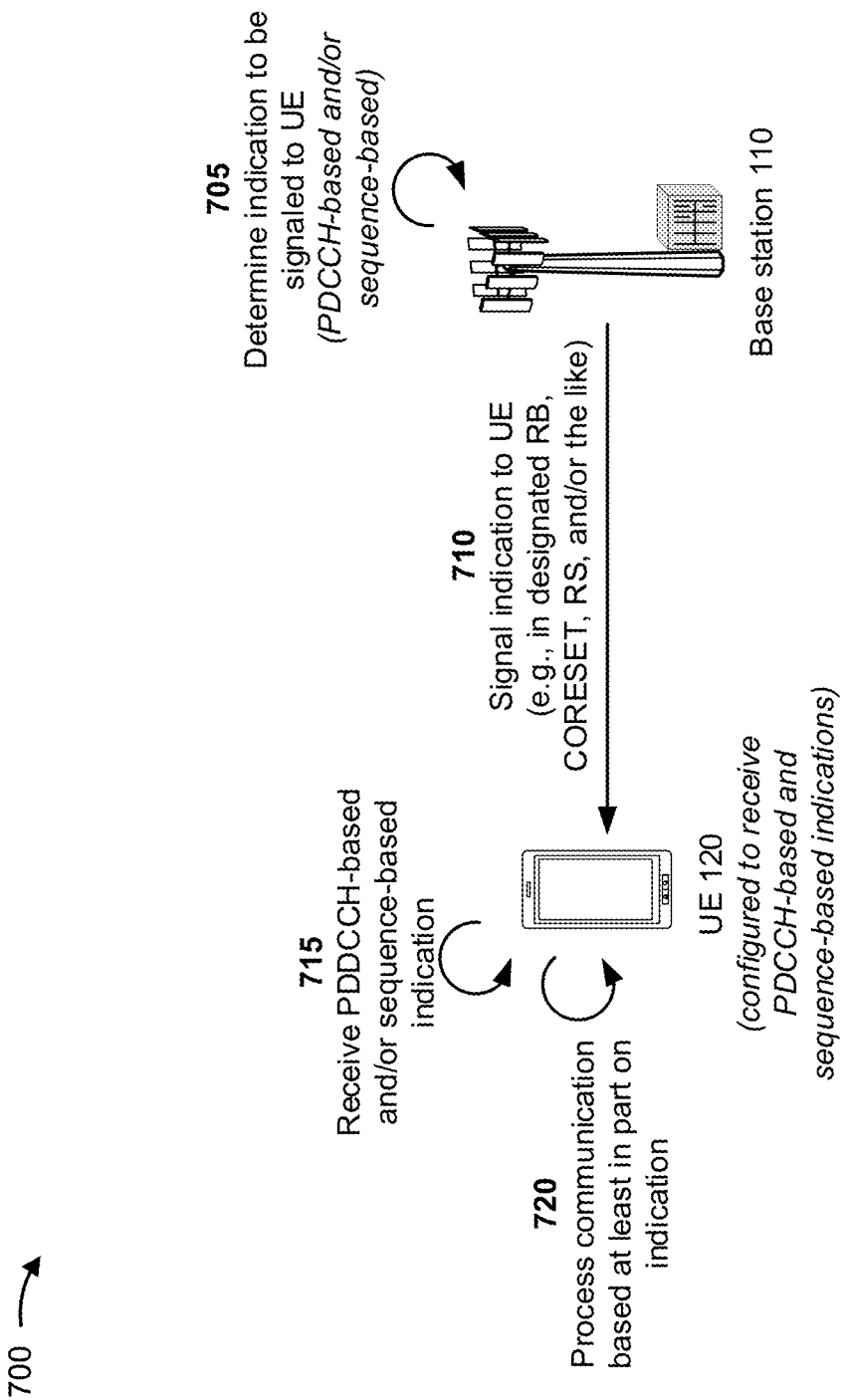
FIG. 7 is a diagram illustrating an example associated with indication design and signaling, in accordance with various aspects of the present disclosure.

FIG. 7 is a diagram illustrating an example 700 associated with indication and signaling, in accordance with various aspects of the present disclosure. Notably, while some examples associated with FIG. 7 described herein are described in the context of the indication being an uplink preemption indication, the aspects described herein can be applied to other types of indications, such as an indication serving as a wake-up signal, an indication associated with a two-step PDCCH in a sidelink, or another type of indication.

As shown in FIG. 7, and by reference number 705, a base station (e.g., base station 110) may determine an indication to be signaled to a UE (e.g., a UE 120) in association with processing a communication. For example, the base station may determine an uplink preemption indication to be signaled to the UE in association with stopping a transmission of an uplink communication. For example, in an uplink inter-UE transmission prioritization/multiplexing scenario, the base station may determine that a transmission of an uplink communication by the UE is to be stopped to allow another UE to transmit an uplink communication. As a particular example, if the UE is an eMBB UE (e.g., a UE that is to communicate eMBB traffic), then the base station may determine that a transmission of an uplink communication by the eMBB UE is to be stopped in order to allow a URLLC UE (e.g., a UE that is to communicate URLLC traffic) to transmit an uplink communication in resources scheduled for the eMBB UE.

In some aspects, as indicated in FIG. 7, the base station may determine the indication such that the indication includes a PDCCH-based indication and/or a sequence-based indication. In other words, the indication scheme configured on the base station may permit use of PDCCH-based indications and sequence-based indications, and the base station may determine whether the indication, to be signaled to the UE, comprises a PDCCH-based indication and/or a sequence-based indication.

In some aspects, the indication includes a PDCCH-based indication and does not include a sequence-based indication. In other words, in some aspects, the indication includes only a PDCCH-based indication, or only a sequence-based indication.

In some aspects, whether the indication includes only a PDCCH-based indication or only a sequence-based indication is based at least in part on a payload associated with the indication. Here, the payload is associated with an amount of information to be conveyed in the indication. For example, if the payload needs to convey only that the uplink transmission is to be stopped (e.g., when the indication is an uplink preemption indication), then the base station may determine the indication to include a sequence-based indication. This may be the case when, for example, the indication will be received by a small number of UEs (including the UE) (e.g., such that preemption has a nominal overall impact on UE communications) and/or when preemption is relatively infrequent (e.g., such that the transmission can be reliably rescheduled without significant delay).

As another example, if the payload needs to convey that the uplink transmission is to be stopped and needs to convey other information (e.g., information that identifies a time or a resource at which the uplink transmission is to be stopped, information that identifies a time or a resource at which the uplink communication can be resumed, and/or the like), then the base station may determine the indication to include a PDCCH-based indication. This may be the case when, for example, the indication will be received by many UEs (including the UE) and/or when preemption is relatively frequent (e.g., such that the transmission cannot be reliably rescheduled without significant delay).

In some aspects, the base station may determine whether the indication includes only a PDCCH-based indication or only a sequence-based indication based at least in part on a type of information to be conveyed in the indication, as indicated above. In some aspects, the base station may determine whether the indication includes only a PDCCH-based indication or only a sequence-based indication based at least in part on a threshold. The threshold may include, for example, a threshold number of symbols needed to signal the indication.

In some aspects, the indication includes both a PDCCH-based indication and a sequence-based indication. In other words, in some aspects, the base station may determine that the indication is to be a combination of a sequence-based indication and a PDCCH-based indication.

In some aspects, sequence-based indications (which require comparatively fewer resources than PDCCH-based indications) can be transmitted by the base station on a comparatively more frequent basis than PDCCH-based indications, but may provide only coarse information, as described above. In some aspects, this characteristic can be used in association with signaling an indication that comprises both a sequence-based indication and a PDCCH-based indication. For example, a sequence-based indication may be used to indicate, to the UE, to expect a PDCCH-based indication. In such a case, upon receiving the sequence-based indication, the UE may increase a frequency of PDCCH monitoring. Continuing with this example, the UE may, based at least in part on increasing the frequency of PDCCH monitoring, receive the PDCCH-based indication. As described above, the PDCCH-based indication may include information that cannot be carried by the sequence-based indication, such as information associated with identifying a time or a resource associated with stopping and (optionally) a time or a resource associated with resuming the transmission of the uplink communication. Notably, in this example, the increased PDCCH monitoring occurs only after the UE detects a sequence-based indication. Thus, UE resources (e.g., battery power, processing resources, and/or the like) can be conserved when the indication includes both a sequence-based indication and a PDCCH-based indication, while still allowing detailed information to be received by the UE. Of further note, in such an aspect, the base station can transmit PDCCH-based indications less frequently (e.g., once per slot) than sequence-based indications.

As shown by reference number 710, the base station may signal the indication to the UE in association with processing the communication. For example, the base station may signal the indication to the UE in association with stopping the transmission of the uplink communication (e.g., after the base station determines the indication). Additional details regarding signaling of the indication are described below.

As shown by reference number 715, the UE may receive the indication associated with processing the communication. For example, the UE may receive the indication associated with stopping the transmission of the uplink communication. In some aspects, as described above, the indication includes a PDCCH-based indication and/or a sequence-based indication. Thus, in some aspects, the UE is configured to receive PDCCH-based indications and sequence-based indications. In other words, the UE may be configured such that the UE receives both sequence-based indications and PDCCH-based indications. Additional details regarding reception of the indication are described below.

As shown by reference number 720, the UE may process the communication based at least in part on the indication. For example, the UE may stop the transmission of the uplink communication based at least in part on the indication. In some aspects, as described below, the UE may resume the transmission of the uplink communication after stopping the transmission of the uplink communication (e.g., when the indication indicates a time or a resource at which the UE is to resume the uplink transmission).

In some aspects, when the indication includes a sequence-based indication, a location at which the sequence-based indication is signaled by the base station (and received by the UE) may indicate a set of symbols in which the transmission of the uplink communication is to be stopped. In some aspects, a number of symbols in the set of symbols is based at least in part on a number of monitoring occasions associated with a slot. In other words, in some aspects, timing associated with stopping and (optionally) resuming the transmission of the uplink communication can depend on a symbol in which the sequence-based indication is signaled by the base station (and received by the UE). Further, in some cases, the number of symbols (or a span of symbols) affected by the sequence-based indication may be associated with a number of monitoring occasions.

For example, when there are two monitoring occasions configured per slot, then a URLLC uplink communication may have a length of approximately seven symbols or less. Here, if the (eMBB) UE receives the sequence-based indication in the first of two monitoring occasions of a given slot, then the UE may be configured to stop transmission of the uplink communication in the first seven symbols of the slot, and to resume the transmission of the uplink communication in the remaining seven symbols of the slot and/or in a later slot. Conversely, if the UE receives the sequence-based indication in the second of the two monitoring occasions in the given slot, then the UE may be configured to stop the transmission of the uplink in the second seven symbols of the slot and resume the uplink transmission in a later slot.

In some aspects, a sequence associated with a sequence-based indication may be one of a set of sequences, each of which is associated with a respective particular symbol from which the UE is to stop the transmission of the uplink communication until an end of a slot. For example, the UE may be configured with a set of sequences comprising a first sequence, a second sequence, and a third sequence. Here, the first sequence may be associated with a first slot symbol (e.g., symbol 0), the second sequence may be associated with a second slot symbol (e.g., symbol 4), and the third sequence may be associated with a third slot symbol (e.g., symbol 8). In this example, the base station may, when determining the indication, identify whether the UE is to stop the uplink transmission in the first symbol, the second symbol, or the third symbol, and may use the appropriate sequence in the sequence-based indication. The UE, upon receiving the sequence-based indication, may identify the sequence, and may stop the uplink transmission accordingly. As an illustrative example, when the UE identifies the sequence-based indication as including the third sequence, the UE may stop the uplink transmission in symbol 8.

In some aspects, the sequence may further be associated with a particular symbol in which the UE is to resume the transmission of the uplink communication. Continuing with the above example, the first sequence may further be associated with a fourth slot symbol (e.g., symbol 3), the second sequence may further be associated with a fifth slot symbol (e.g., symbol 7), and the third sequence may further be associated with a sixth slot symbol (e.g., symbol 11). Here, upon receiving the sequence-based indication, the UE may identify the sequence, and stop and (later) resume the uplink transmission accordingly. As an illustrative example, when the UE identifies the sequence-based indication as including the second sequence, the UE may stop the uplink transmission in symbol 4 and resume the uplink transmission in symbol 7.

In some aspects, when the indication includes the sequence-based indication, the base station may signal, and the UE may receive, the indication at least partially in a resource block designated for sequence-based indication signaling. In some aspects, such a resource block may be at or near an edge of a bandwidth part and/or may be adjacent to a control resource set (CORESET).

In some aspects, when the indication includes the sequence-based indication, the base station may signal, and the UE may receive, the indication at least partially in a CORESET. In some aspects, the CORESET may be one in which one or more control channel elements (CCEs) or one or more candidates are designated for sequence-based indication signaling (e.g., rather than for decoding DCI).

In some aspects, when the indication includes the sequence-based indication, the base station may signal, and the UE may receive, the indication based at least in part on a reference signal (e.g., a reference signal with a structure similar to that of a tracking reference signal (TRS), a channel state information reference signal (CSI-RS), and/or the like). Here, PDSCH communications for UEs, including the UE, may be rate matched around resources designated for sequence-based indications regardless of whether the UEs are to receive sequence-based indications. In other words, the rate matching pattern can be configured on each of the UEs regardless of whether they expect to receive sequence-based indications (e.g., in a manner similar to that associated with rate matching around a TRS or a CSI-RS).

In a carrier aggregation scenario, in some aspects, the indication (e.g., a sequence-based indication or PDCCH-based indication) may indicate preemption on one or more frequency bands of a plurality of frequency bands on which the UE is configured to transmit the uplink communication (e.g., different sequences can be used to indicate preemption for different frequency bands).

Similarly, in some aspects, the indication may indicate preemption on each of a plurality of component carriers on which the UE is configured to transmit the uplink communication. In some aspects, such a configuration can be per band or band combination. In some aspects, the transmission of the uplink communication may be resumed on the plurality of component carriers based at least in part on whether the plurality of component carriers are intra-band contiguous, non-contiguous, or inter-band, or based at least in part on whether the UE can maintain a phase associated with the plurality of component carriers.

As indicated above, FIG. 7 is are provided as an example. Other examples may differ from what is described with respect to FIG. 7.

Figure 8:
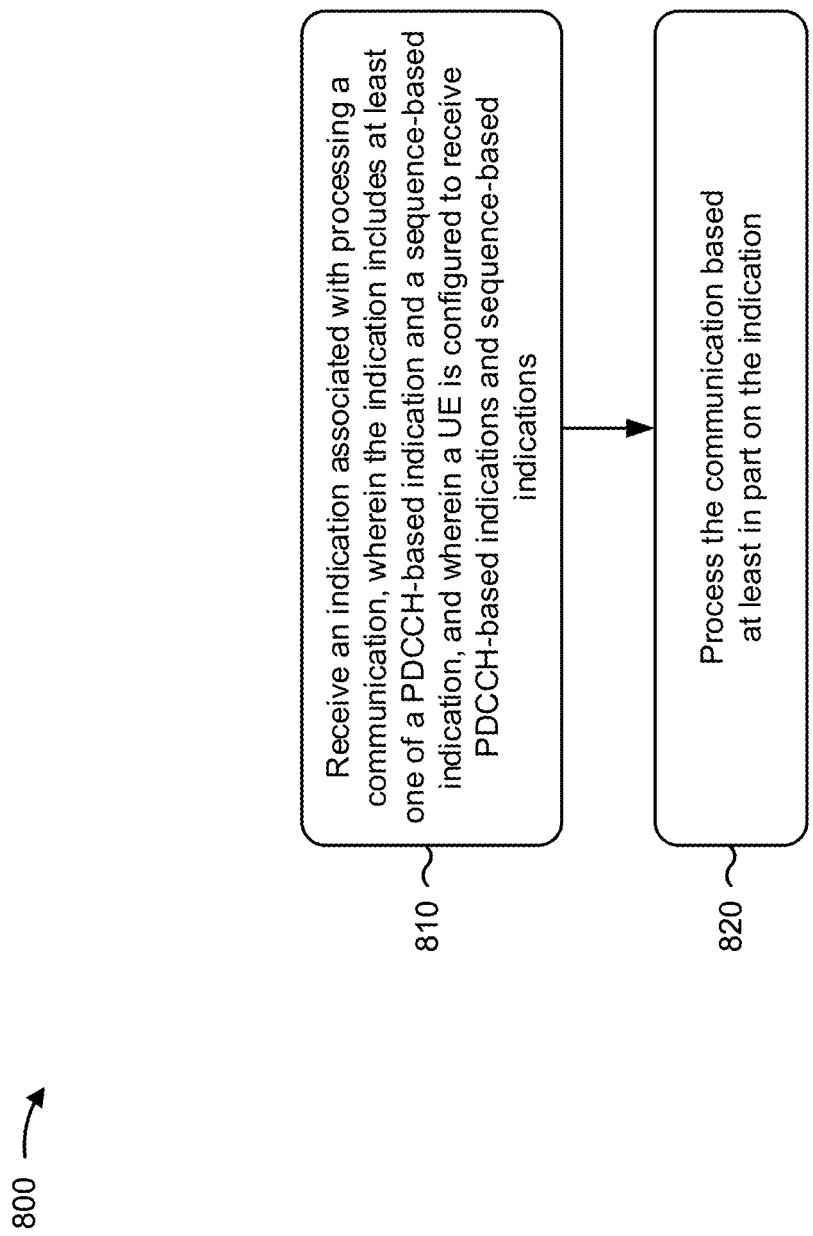
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs operations associated with indication design and signaling.

As shown in FIG. 8, in some aspects, process 800 may include receiving an indication associated with processing a communication (block 810). For example, the UE (e.g., using antenna 252, demodulator 254, MIMO detector 256, receive processor 258, controller/processor 280, memory 282, and/or the like) may receive an indication associated with stopping a transmission of an uplink communication, as described above. In some aspects, the indication includes at least one of a PDCCH-based indication and a sequence-based indication. In some aspects, the UE is configured to receive PDCCH-based indications and sequence-based indications.

As further shown in FIG. 8, in some aspects, process 800 may include processing the communication based at least in part on the indication (block 820). For example, the UE (e.g., using transmit processor 264, controller/processor 280, memory 282, and/or the like) may stop the transmission of the uplink communication based at least in part on the indication, as described above.

Process 800 may include additional aspects, such as any single aspect or any combination of aspects described below and/or in connection with one or more other processes described elsewhere herein.

In a first aspect, the indication includes the PDCCH-based indication and does not include the sequence-based indication, or includes the sequence-based indication and does not include the PDCCH-based indication.

In a second aspect, alone or in combination with the first aspect, whether the indication includes the PDCCH-based indication and does not include the sequence-based indication, or includes the sequence-based indication and does not include the PDCCH-based indication is based at least in part on a payload associated with the indication.

In a third aspect, alone or in combination with one or more of the first and second aspects, the indication includes both the PDCCH-based indication and the sequence-based indication.

In a fourth aspect, alone or in combination with one or more of the first through third aspects, the sequence-based indication causes the UE to increase PDCCH monitoring in association with receiving the PDCCH-based indication.

In a fifth aspect, alone or in combination with one or more of the first through fourth aspects, the indication is an uplink preemption indication that indicates when the UE is to resume the transmission of the uplink communication after stopping the transmission of the uplink communication.

In a sixth aspect, alone or in combination with one or more of the first through fifth aspects, when the indication includes the sequence-based indication, a location at which the sequence-based indication is received indicates a set of symbols associated with processing the communication (e.g., a set of symbols in which the transmission of the uplink communication is to be stopped).

In a seventh aspect, alone or in combination with one or more of the first through sixth aspects, a number of symbols in the set of symbols is based at least in part on a number of monitoring occasions associated with a slot.

In an eighth aspect, alone or in combination with one or more of the first through seventh aspects, a sequence associated with the sequence-based indication is one of a set of sequences, wherein each sequence, of the set of sequences, is associated with a respective particular symbol associated with processing the communication (e.g., a respective particular symbol from which the UE is to stop the transmission of the uplink communication until an end of a slot).

In a ninth aspect, alone or in combination with one or more of the first through eighth aspects, a sequence associated with the sequence-based indication is one of a set of sequences, wherein each sequence, of the set of sequences, is associated with a first respective particular symbol associated with processing the communication (e.g., a symbol from which the UE is to stop the transmission of the uplink communication) and a second respective particular symbol associated with processing the communication (e.g., a symbol in which the UE is to resume the transmission of the uplink communication).

In a tenth aspect, alone or in combination with one or more of the first through ninth aspects, when the indication includes the sequence-based indication, the indication is at least partially received in a resource block designated for sequence-based indication signaling.

In an eleventh aspect, alone or in combination with one or more of the first through tenth aspects, the resource block is at an edge of a bandwidth part or is adjacent to a control resource set (CORESET).

In a twelfth aspect, alone or in combination with one or more of the first through eleventh aspects, when the indication includes the sequence-based indication, the indication is at least partially received in a CORESET in which one or more control channel elements or one or more candidates are designated for sequence-based indication signaling.

In a thirteenth aspect, alone or in combination with one or more of the first through twelfth aspects, when the indication includes the sequence-based indication, the indication is received based at least in part on a reference signal.

In a fourteenth aspect, alone or in combination with one or more of the first through thirteenth aspects, physical downlink shared channel (PDSCH) communications for a plurality of UEs, including the UE, are rate matched around resources designated for sequence-based indications regardless of whether the plurality of UEs is to receive the sequence-based indications.

In a fifteenth aspect, alone or in combination with one or more of the first through fourteenth aspects, the indication indicates preemption on one or more frequency bands of a plurality of frequency bands associated with the communication (e.g., a plurality of frequency bands on which the UE is configured to transmit the uplink communication).

In a sixteenth aspect, alone or in combination with one or more of the first through fifteenth aspects, the indication indicates preemption on each of a plurality of component carriers associated with processing the communication (e.g., a plurality of component carriers on which the UE is configured to transmit the uplink communication).

In a seventeenth aspect, alone or in combination with one or more of the first through sixteenth aspects, processing the communication includes stopping a transmission of the uplink communication, and the transmission of the communication is resumed on the plurality of component carriers based at least in part on whether at least one of: the plurality of component carriers are intra-band contiguous, non-contiguous, or inter-band; or the UE can maintain a phase associated with the plurality of component carriers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
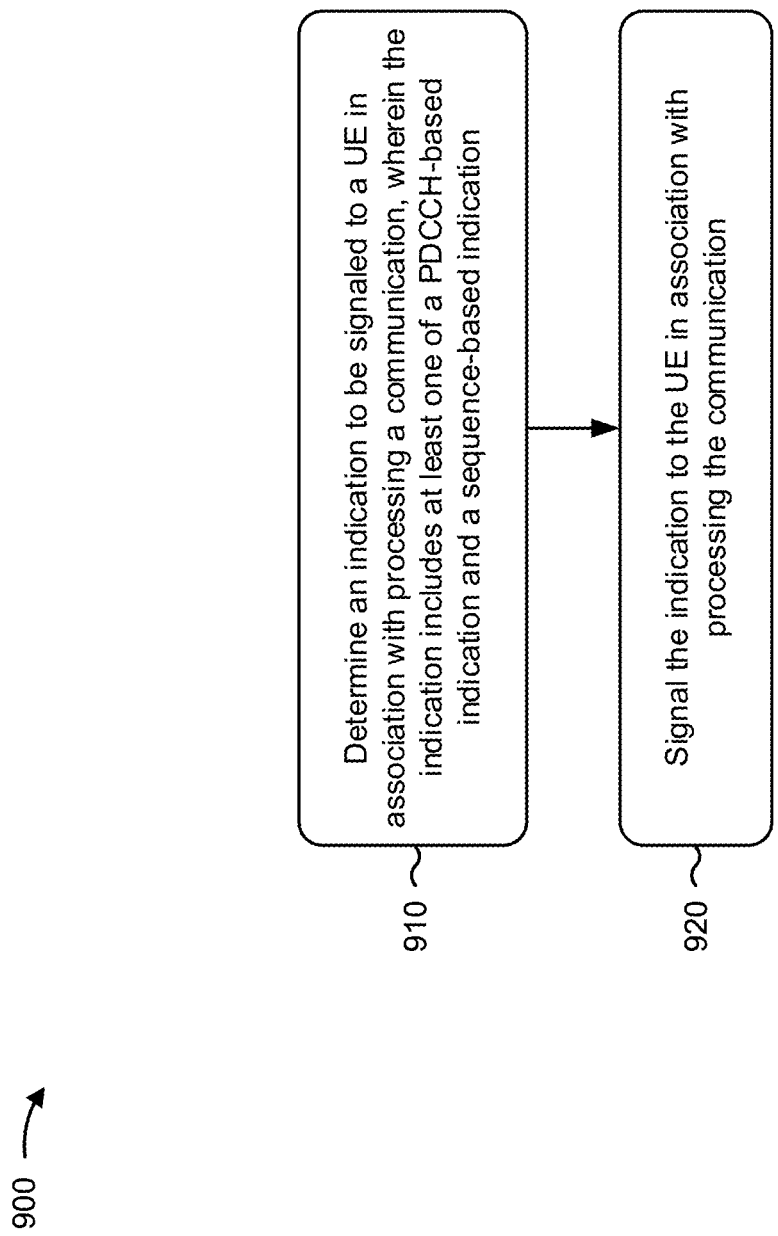
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110) performs operations associated with indication design and signaling.

As shown in FIG. 9, in some aspects, process 900 may include determining an indication to be signaled to a UE in association with processing a communication (block 910). For example, the base station (e.g., using transmit processor 220, TX MIMO processor 230, modulator 232, controller/processor 240, memory 242, and/or the like) may determine an indication to be signaled to a UE (e.g., UE 120) in association with stopping a transmission of an uplink communication, as described above. In some aspects, the indication includes at least one of a PDCCH-based indication and a sequence-based indication.

As further shown in FIG. 9, in some aspects, process 900 may include signaling the indication to the UE in association with processing the communication (block 920). For example, the base station (e.g., using antenna 234, TX MIMO processor 230, modulator 232, transmit processor 220, controller/processor 240, memory 242, and/or the like) may signal the indication to the UE in association with stopping the transmission of the uplink communication, as described above.

Process 900 may include additional aspects, such as any single aspect or any combination of aspects described below and/or in connection with one or more other processes described elsewhere herein.

In a first aspect, the indication includes the PDCCH-based indication and does not include the sequence-based indication, or includes the sequence-based indication and does not include the PDCCH-based indication.

In a second aspect, alone or in combination with the first aspect, whether the indication includes the PDCCH-based indication and does not include the sequence-based indication, or includes the sequence-based indication and does not include the PDCCH-based indication is based at least in part on a payload associated with the indication.

In a third aspect, alone or in combination with one or more of the first and second aspects, the indication includes both the PDCCH-based indication and the sequence-based indication.

In a fourth aspect, alone or in combination with one or more of the first through third aspects, the sequence-based indication is to cause the UE to increase PDCCH monitoring in association with receiving the PDCCH-based indication.

In a fifth aspect, alone or in combination with any one or more of the first through fourth aspects, the indication indicates when the UE is to resume the transmission of the communication after stopping the transmission of the communication.

In a sixth aspect, alone or in combination with one or more of the first through fifth aspects, when the indication includes the sequence-based indication, a location at which the sequence-based indication is signaled indicates a set of symbols associated with processing the communication (e.g., a set of symbols in which the transmission of the uplink communication is to be stopped).

In a seventh aspect, alone or in combination with one or more of the first through sixth aspects, a number of symbols in the set of symbols is based at least in part on a number of monitoring occasions associated with a slot.

In an eighth aspect, alone or in combination with one or more of the first through seventh aspects, a sequence associated with the sequence-based indication is one of a set of sequences, wherein each sequence, of the set of sequences, is associated with a respective particular symbol associated with processing the communication (e.g., a symbol from which the UE is to stop the transmission of the uplink communication until an end of a slot).

In a ninth aspect, alone or in combination with one or more of the first through eighth aspects, a sequence associated with the sequence-based indication is one of a set of sequences, wherein each sequence, of the set of sequences, is associated with a first respective particular symbol associated with processing the communication (e.g., a symbol from which the UE is to stop the transmission of the uplink communication) and a second respective particular symbol associated with processing the communication (e.g., a symbol in which the UE is to resume the transmission of the uplink communication).

In a tenth aspect, alone or in combination with one or more of the first through ninth aspects, when the indication includes the sequence-based indication, the indication is at least partially signaled in a resource block designated for sequence-based indication signaling.

In an eleventh aspect, alone or in combination with one or more of the first through tenth aspects, the resource block is at an edge of a bandwidth part or is adjacent to a CORESET.

In a twelfth aspect, alone or in combination with one or more of the first through eleventh aspects, when the indication includes the sequence-based indication, the indication is at least partially signaled in a CORESET in which one or more control channel elements or one or more candidates are designated for sequence-based indication signaling.

In a thirteenth aspect, alone or in combination with one or more of the first through twelfth aspects, when the indication includes the sequence-based indication, the indication is signaled based at least in part on a reference signal.

In a fourteenth aspect, alone or in combination with one or more of the first through thirteenth aspects, PDSCH communications for a plurality of UEs, including the UE, are rate matched around resources designated for sequence-based indications regardless of whether the plurality of UEs is to receive the sequence-based indications.

In a fifteenth aspect, alone or in combination with one or more of the first through fourteenth aspects, the indication indicates preemption on one or more frequency bands of a plurality of frequency bands associated with processing the communication (e.g., a plurality of frequency bands on which the UE is configured to transmit the uplink communication).

In a sixteenth aspect, alone or in combination with one or more of the first through fifteenth aspects, the indication indicates preemption on each of a plurality of component carriers associated with processing the communication (e.g., a plurality of component carriers on which the UE is configured to transmit the uplink communication).

In a seventeenth aspect, alone or in combination with one or more of the first through sixteenth aspects, processing the communication includes stopping a transmission of the communication, and the transmission of the communication is resumed on the plurality of component carriers based at least in part on whether at least one of: the plurality of component carriers is intra-band contiguous, non-contiguous, or inter-band; or the UE can maintain a phase associated with the plurality of component carriers.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving an indication associated with a communication,
wherein the indication includes at least one of a physical downlink control channel (PDCCH)-based indication and a sequence-based indication,
wherein the UE is configured to receive PDCCH-based indications and sequence-based indications,
wherein whether the indication includes the PDCCH-based indication and does not include the sequence-based indication, or includes the sequence-based indication and does not include the PDCCH-based indication is based at least in part on a payload associated with the indication, and
wherein the indication is an uplink preemption indication that indicates both when the UE is to stop a transmission of the communication and when the UE is to resume the transmission of the communication after stopping the transmission of the communication; and processing the communication based at least in part on the indication.

2. The method of claim 1, wherein the indication includes the PDCCH-based indication and does not include the sequence-based indication, or includes the sequence-based indication and does not include the PDCCH-based indication.

3. The method of claim 1, wherein the indication includes both the PDCCH-based indication and the sequence-based indication.

4. The method of claim 1, wherein the sequence-based indication causes the UE to increase PDCCH monitoring in association with receiving the PDCCH-based indication.

5. The method of claim 1, wherein, when the indication includes the sequence-based indication, a location, within a slot, at which the sequence-based indication is received indicates a set of symbols associated with processing the communication.

6. The method of claim 5, wherein a number of symbols in the set of symbols is based at least in part on a number of monitoring occasions associated with a slot.

7. The method of claim 1, wherein a sequence associated with the sequence-based indication is one of a set of sequences,
wherein each sequence, of the set of sequences, is associated with a respective particular symbol associated with processing the communication.

8. The method of claim 1, wherein a sequence associated with the sequence-based indication is one of a set of sequences,
wherein each sequence, of the set of sequences, is associated with a first respective particular symbol associated with processing the communication and a second respective particular symbol associated with processing the communication.

9. The method of claim 1, wherein, when the indication includes the sequence-based indication, the indication is at least partially received in a resource block designated for sequence-based indication signaling.

10. The method of claim 9, wherein the resource block is at an edge of a bandwidth part or is adjacent to a control resource set (CORESET).

11. The method of claim 1, wherein, when the indication includes the sequence-based indication, the indication is at least partially received in a control resource set (CORESET) in which one or more control channel elements or one or more candidates are designated for sequence-based indication signaling.

12. The method of claim 1, wherein, when the indication includes the sequence-based indication, the indication is received based at least in part on a reference signal.

13. The method of claim 1, wherein physical downlink shared channel (PDSCH) communications for a plurality of UEs, including the UE, are rate matched around resources designated for sequence-based indications regardless of whether the plurality of UEs is to receive the sequence-based indications.

14. The method of claim 1, wherein the indication indicates preemption on one or more frequency bands of a plurality of frequency bands associated with the communication.

15. The method of claim 1, wherein the indication indicates preemption on each of a plurality of component carriers associated with the communication.

16. The method of claim 15, wherein processing the communication includes stopping a transmission of the communication, and the transmission of the communication is resumed on the plurality of component carriers based at least in part on whether at least one of:
the plurality of component carriers is intra-band contiguous, non-contiguous, or inter-band, or
the UE can maintain a phase associated with the plurality of component carriers.

17. A method of wireless communication performed by a base station, comprising:
determining an indication to be signaled to a user equipment (UE) in association with processing a communication,
wherein the indication includes at least one of a physical downlink control channel (PDCCH)-based indication and a sequence-based indication,
wherein whether the indication includes the PDCCH-based indication and does not include the sequence-based indication, or includes the sequence-based indication and does not include the PDCCH-based indication is based at least in part on a payload associated with the indication, and
wherein the indication is an uplink preemption indication that indicates both when the UE is to stop a transmission of the communication and when the UE is to resume the transmission of the communication after stopping the transmission of the communication; and
signaling the indication to the UE in association with processing the communication.

18. The method of claim 17, wherein the indication includes the PDCCH-based indication and does not include the sequence-based indication, or includes the sequence-based indication and does not include the PDCCH-based indication.

19. The method of claim 17, wherein the indication includes both the PDCCH-based indication and the sequence-based indication.

20. The method of claim 19, wherein the sequence-based indication is to cause the UE to increase PDCCH monitoring in association with receiving the PDCCH-based indication.

21. The method of claim 17, wherein, when the indication includes the sequence-based indication, the indication is at least partially signaled in a resource block designated for sequence-based indication signaling.

22. The method of claim 21, wherein the resource block is at an edge of a bandwidth part or is adjacent to a control resource set (CORESET).

23. The method of claim 17, wherein, when the indication includes the sequence-based indication, the indication is at least partially signaled in a control resource set (CORESET) in which one or more control channel elements or one or more candidates are designated for sequence-based indication signaling.

24. The method of claim 17, wherein, when the indication includes the sequence-based indication, the indication is signaled based at least in part on a reference signal.

25. The method of claim 17, wherein physical downlink shared channel (PDSCH) communications for a plurality of UEs, including the UE, are rate matched around resources designated for sequence-based indications regardless of whether the plurality of UEs is to receive the sequence-based indications.

26. A user equipment (UE) for wireless communication, comprising:
- a memory; and
- one or more processors operatively coupled to the memory, the memory and the one or more processors configured to:
  - receive an indication associated with processing a communication,
    - wherein the indication includes at least one of a physical downlink control channel (PDCCH)-based indication and a sequence-based indication,
    - wherein the UE is configured to receive PDCCH-based indications and sequence-based indications,
    - wherein whether the indication includes the PDCCH-based indication and does not include the sequence-based indication, or includes the sequence-based indication and does not include the PDCCH-based indication is based at least in part on a payload associated with the indication, and
    - wherein the indication is an uplink preemption indication that indicates both when the UE is to stop a transmission of the communication and when the UE is to resume the transmission of the communication after stopping the transmission of the communication; and
  - process the communication based at least in part on the indication.

27. A base station for wireless communication, comprising:
- a memory; and
- one or more processors operatively coupled to the memory, the memory and the one or more processors configured to:
  - determine an indication to be signaled to a user equipment (UE) in association with processing a communication,
    - wherein the indication includes at least one of a physical downlink control channel (PDCCH)-based indication and a sequence-based indication,
    - wherein whether the indication includes the PDCCH-based indication and does not include the sequence-based indication, or includes the sequence-based indication and does not include the PDCCH-based indication is based at least in part on a payload associated with the indication, and
    - wherein the indication is an uplink preemption indication that indicates both when the UE is to stop a transmission of the communication and when the UE is to resume the transmission of the communication after stopping the transmission of the communication; and
  - signal the indication to the UE in association with processing the communication.

28. The UE of claim 26, wherein, when the indication includes the sequence-based indication, a location, within a slot, at which the sequence-based indication is received indicates a set of symbols associated with processing the communication.

29. The UE of claim 26, wherein the indication indicates preemption on each of a plurality of component carriers associated with the communication.

30. The base station of claim 27, wherein the indication indicates preemption on each of a plurality of component carriers associated with the communication.

* * * * *